Patented Aug. 8, 1950

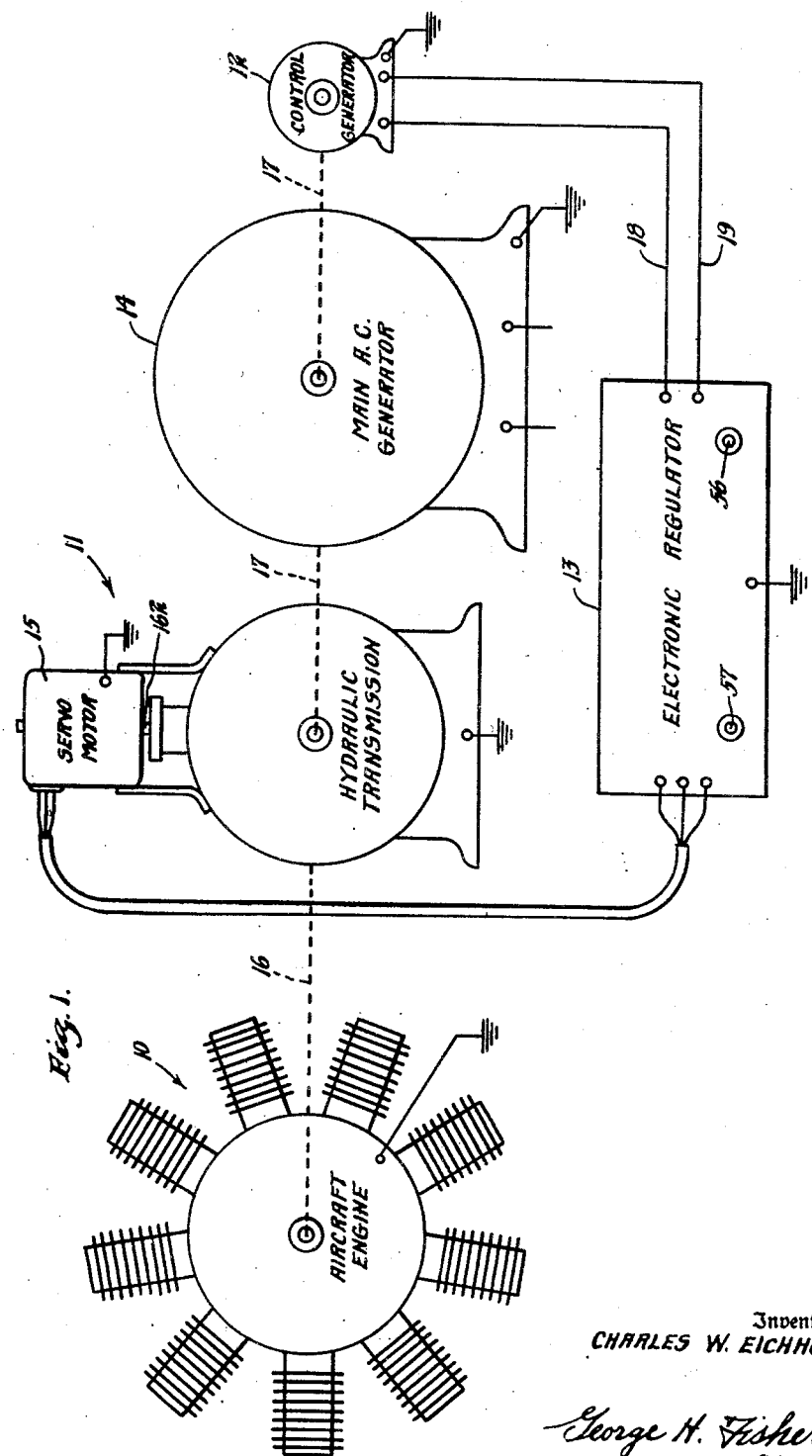

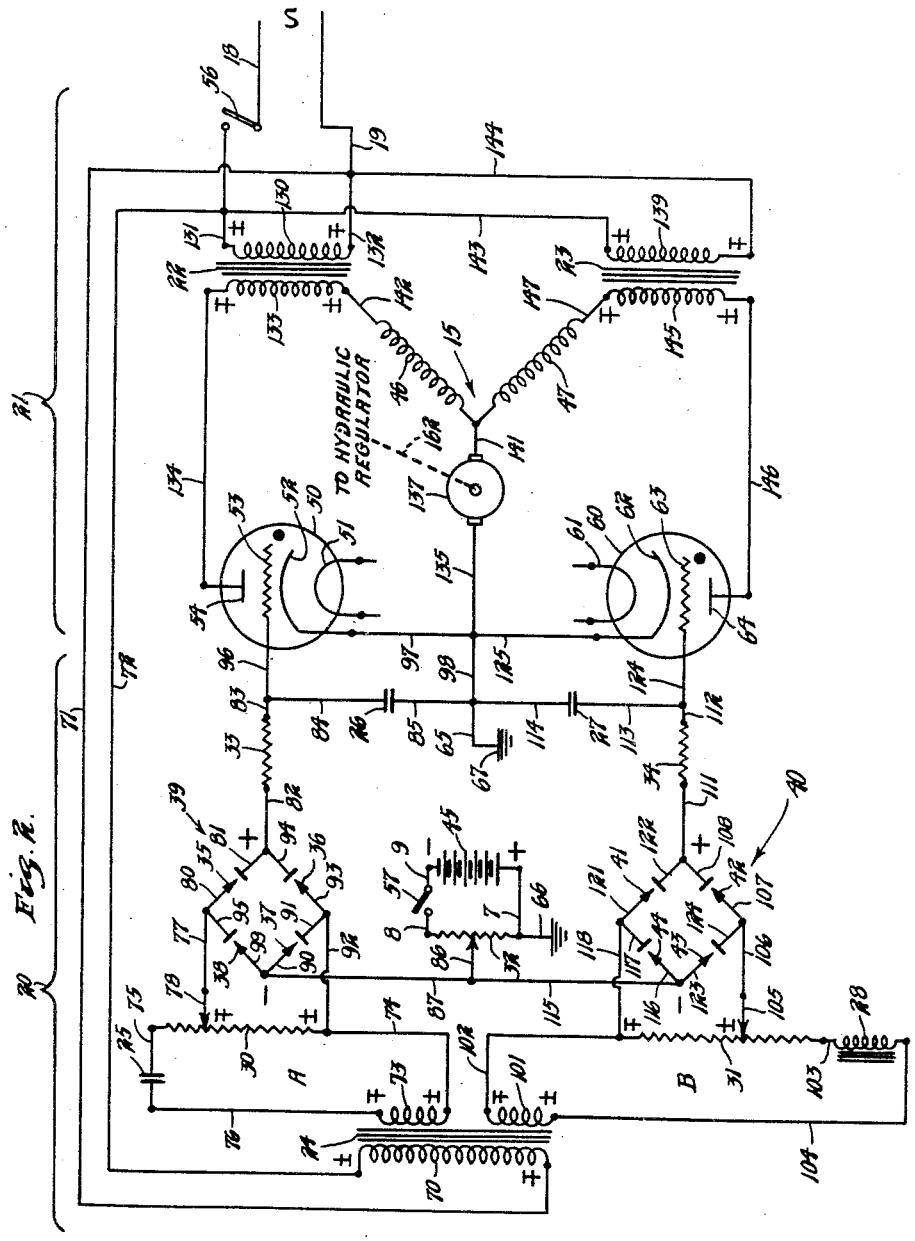

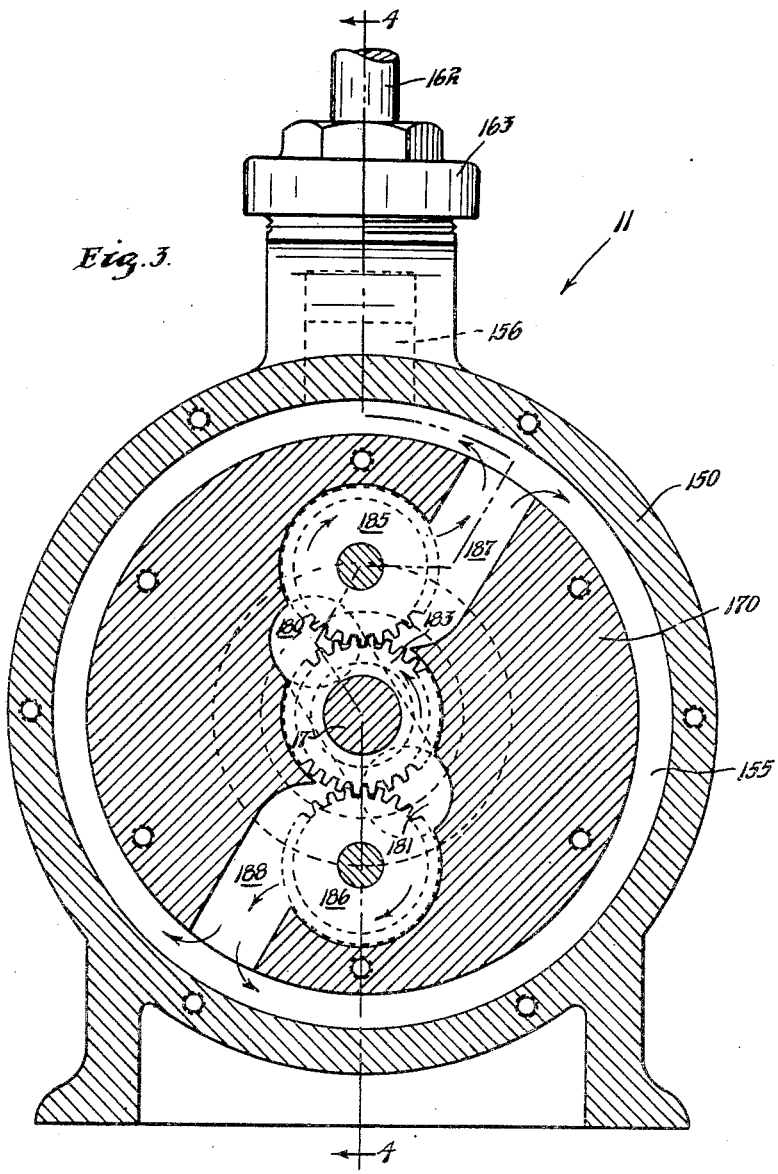

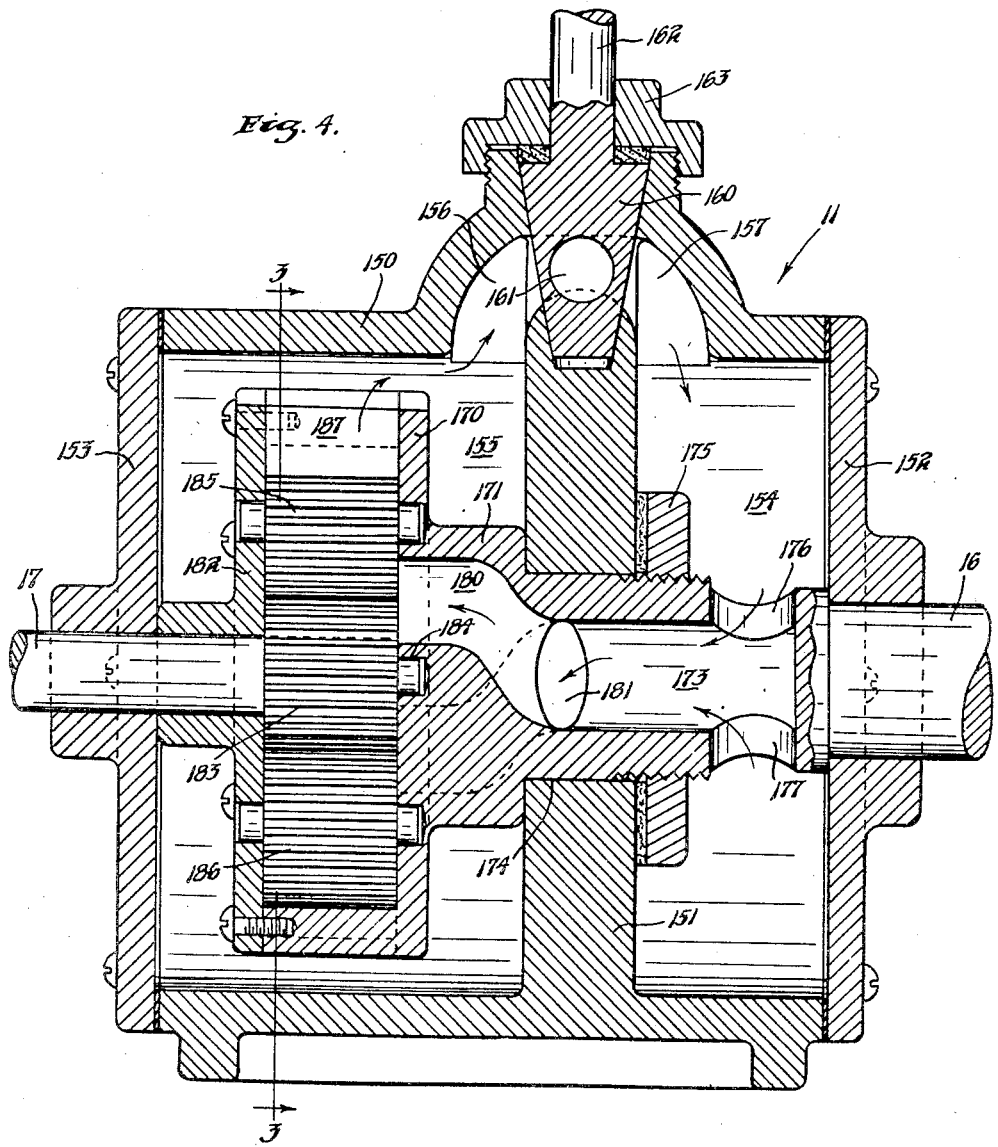

2,518,129

UNITED STATES PATENT OFFICE 2,518,129

CONTROL DEVICE

Charles W. Eichhorn, Weston, Mass., assignor to Minneapolis-Honeywell Regulator Company, Minneapolis, Minn., a corporation of Delaware Application October 23, 1943, Serial No. 507,462

1 Claim. (Cl. 322—40)

This invention relates to control devices, and more particularly to such devices which have for their purpose to maintain constant a characteristic of the electrical output of a machine which is driven by a motor whose speed varies widely.

As is well known, the operation of modern aircraft, particularly military craft, requires the expenditure of a considerable amount of electrical energy in the actuation of the various controls, indicators, communication devices, and so forth. The source of this electrical energy is ordinarily a generator or alternator which may be self excited or excited from the ship's battery, and which may receive its power either from the ship's engine or from a secondary propeller, wind driven by the passage of the craft through the air. The speed of either of these motors varies widely, depending on the load, wind, altitude, speed of the craft, flying evolutions, and other conditions. Yet it is desirable that the output of the electrical machine be maintained substantially constant. The frequency, for example, of the output of an alternator should not be allowed to vary so far that electronic and other devices designed to operate at a given frequency suffer appreciable or severe diminution in efficiency.

It will be realized, of course, that the problem is not limited exclusively to provision of electrical power in aircraft, but arises in any case when a source of power whose speed varies is used to drive an electrical machine whose output is desired to remain constant. The field of wind driven generators is such a field distinct from the aircraft field.

It is therefore an object of my invention to provide an improved means for regulating the output of a dynamo-electric machine.

It is another object of my invention to provide means for maintaining the output of a dynamo-electric machine constant in the presence of variable power input to the machine.

A further object of my invention is to provide a means for maintaining the frequency of the output of an alternator constant in the presence of wide variations in the speed of the driving means.

A more specific object of my invention is to provide electronic-hydraulic means for regulating a characteristic of the output of a dynamoelectirc machine.

Yet another object of my invention is to provide means for maintaining the speed of a driven shaft constant in the presence of wide variations in the speed of a driving shaft.

Other objects and advantages of my invention will appear from a study of the following specification, and the subjoined claim, together with the drawing which is attached hereto and which forms a part hereof, and in which:

Figure 1 is a diagrammatic showing of a system comprising one embodiment of my invention;

Figure 2 is a circuit diagram showing an organization making up a preferred embodiment of an electronic frequency responsive device forming an important part of my invention;

Figure 3 is an end view of a hydraulic regulator also comprising an important part of my invention in a preferred form; parts of this device are broken away for purposes of illustration along the line 3—3 of Figure 4; and Figure 4 is a longitudinal sectional view of the device of Figure 3, the section being taken along the line 4—4 of Figure 3.

It should be borne in mind that although I have shown a preferred embodiment of a system and elements representative of my invention, various other electrical or mechanical expedients for accomplishing the invention may become apparent to those skilled in the art. Therefore, those details of structure and organization which are presented in the drawings and described in the specification must be taken as illustrative only, and I do not conceive that my invention is limited to the use of such particulars.

Structure

Referring now to Figure 1 of my drawing, it will be seen that an embodiment of my invention may comprise a prime mover 10 or other source of mechanical energy, a power transmission device 11, an electrical generator 12, and an electronic regulator 13. For purposes of illustration, I have shown my prime mover to be an aircraft engine, and my variable power device to comprise a hydraulic transmission. I have also shown my generator 12 to be separate from and subsidiary to a main generator 14, but the provision of a control generator separate from the main generator is purely a matter of choice and the actuating potentials can be taken from the output of the main generator itself at the will of the designer. I have further shown hydraulic transmission 11 as being regulated by a direct current servomotor 15 under the control of the electronic regulator 13, but the substitution for this particular hydraulic transmission of various equivalents is an obvious expedient and I conceive it to be included in the spirit of my invention.

It will be observed that the various rotary machines are coupled to a pair of shafts 16 and 17, shaft 16 connecting the prime mover with the hydraulic transmission, and shaft 17 connecting the hydraulic transmission to the main A. C. generator and the control generator for unitary operation.

Members 10, 12, and 14 may be of any commercially available design, and detailed description of their structure and operation is not necessary in this specification. Before passing on to a detailed consideration of the structure of elements 13 and 11, I will set forth briefly the theory of operation of my invention.

Shaft 16 is driven at a variable speed by prime mover 10. If the electrical output of member 12, for example the frequency of the alternating current produced thereby, is to be maintained constant, the speed of rotation of shaft 17 must similarly be maintained constant. Therefore hydraulic transmission 11 is inserted between shaft 16 and shaft 17, permitting variation in the relative speeds of rotation of shaft 16 and shaft 17. This variation in power ratio obtainable through member 11 is regulated by the action of servomotor 15 under the control of electronic regulator 13, which is responsive to variations in a characteristic of the electrical output of member 12—in this case to variations in the frequency of the output. Thus, if the speed of shaft 16 increases over an arbitrarily selected normal speed, the frequency of the output of generator 12 increases or tends to increase, and in response to this detrimental increase in frequency, regulator 13 energizes servomotor 15 to regulate transmission 11 in such a manner as to decrease the power ratio between shaft 16 and shaft 17, thus decreasing the speed of shaft 17 with respect to shaft 16. Similarly, if the speed of shaft 16 drops below the selected speed, the frequency of the output of generator 12 drops or tends to drop below the intended frequency by a small decrement and this causes regulator 13 to energize servomotor 15 to regulate transmission 11 in such a manner as to increase the power ratio between shaft 16 and shaft 17, thereby increasing the speed of shaft 17 and bringing the frequency back to its desired value. The detailed structure bringing about this desired result will now be described.

In Figure 2 I have illustrated an electronic regulator adapted to comprise a significant portion of my invention. It will be seen that the regulator is comprised of two inter-related portions, a frequency responsive portion 20 and a motor control portion 21. The polarities of certain direct current elements are noted, and instantaneous polarities of certain alternating current elements are also indicated for ready reference.

Electrical energy in the form of alternating current of variable frequency is provided to the regulator by conductors 18 and 19: a switch 56 is provided to interrupt the supply of current to the regulator. On closing switch 56, electrical energy passes by conductors 71 and 72 to primary winding 70 of a transformer 24 having a pair of secondary windings 73 and 101. Energization of winding 70 induces a potential in the first secondary winding 73, causing current to flow from winding 73, through conductor 74, a potentiometer 30, conductor 75, a capacitor 25, and conductor 76. A portion of the IR drop in potentiometer 30 produces a current flow through one of a pair of paths as follows, depending on the instantaneous polarity of the potentials across the potentiometer.

When the movable contact 78 of potentiometer 30 is positive with respect to its lower terminal, the current flows therefrom through conductors 77 and 80, a rectifier 35, conductors 81 and 82, a resistor 33, conductors 83 and 84, a capacitor 26, conductors 85 and 65, a ground connection 67, the ground, a secured ground connection 66, a portion of a grid bias potentiometer 32, conductors 86, 87, and 90, a second rectifier 37, and conductors 91 and 92 to the negative lower terminal of potentiometer 30.

When the movable contact 78 of potentiometer 30 is negative with respect to its lower terminal, current flows as follows: from the lower terminal of potentiometer 30 through conductors 92 and 93, a third rectifier 36, conductors 94 and 82, resistor 33, conductors 83 and 84, capacitor 26, conductors 85 and 65, ground connection 67, the ground, ground connection 66, a portion of potentiometer 32, conductors 86, 87, and 99, a fourth rectifier 38, and conductors 95 and 77 to the negative movable contact 78 of potentiometer 30.

It will be noted that rectifiers 35, 36, 37, and 38 are connected to form a conventional rectifier bridge.

The grid 53 of a triode 50 is connected to resistor 33 and capacitor 26 by conductor 96. The cathode 52 of triode 50 is connected to capacitor 26 and ground connection 67 by conductor 97 and conductor 98. The input voltage impressed on triode 50 is therefore the D. C. voltage drop appearing across resistor 33, the rectifier bridge, and the in-circuit portion of potentiometer 32, all in series. In parallel with this drop is a small A. C. ripple drop across condenser 26.

A grid bias battery 45 is connected, by closing a switch 57, in a circuit as follows: from the positive terminal of the battery through conductor 7, grid biasing potentiometer 32, conductor 8, switch 57, and conductor 9 back to the negative terminal of the battery.

Cathode 52 of triode 50 is connected to the fixed positive terminal of grid bias potentiometer 32 by conductors 97, 98, and 65, ground connection 67, the ground, and ground connection 66. Grid 53 is connected to the movable negative terminal of grid bias potentiometer 32 by conductor 96, conductor 83, resistor 33, rectifier bridge 39, conductor 87, and conductor 86. Thus, grid 53 is biased negatively by a D. C. voltage dependent upon the position of slider 86.

Energization of winding 70 of transformer 24 also generates potentials in the second secondary winding 101 of transformer 24, causing current to flow from winding 101 through conductor 102, a third potentiometer 31, conductor 103, an inductor 28, and conductor 104. A portion of the voltage drop in potentiometer 31 causes current flow through one of a pair of paths as follows depending on the instantaneous polarity of the potentials across the potentiometer.

When the movable contact 105 of potentiometer 31 is positive with respect to its upper terminal, current flows therefrom through conductors 106 and 107, a fifth rectifier 42, conductors 108 and 111, a second resistor 34, conductors 112 and 113, a second capacitor 27, conductors 114 and 65, ground connection 67, the ground, ground connection 66, the lower portion of potentiometer 32, conductors 86, 115, and 116, a sixth rectifier 44, conductors 117 and 118, and back to the upper negative terminal of potentiometer 31.

When the movable contact of potentiometer 31 is negative with respect to its upper terminal, current flows as follows: from the upper terminal of potentiometer 31 through conductors 118 and 121, a seventh rectifier 41, conductors 122 and 111, resistor 34, conductors 112 and 113, capacitor 27, conductors 114 and 85, ground connection 67, the ground, ground connection 66, the lower portion of potentiometer 32, conductors 86, 115, and 123, an eighth rectifier 43, conductors 124 and 106, and back to the negative movable contact 105 of potentiometer 31.

It will be observed that rectifiers 41, 42, 43, and 44 are connected to form a second conventional rectifier bridge.

The grid 63 of a triode 60 is connected to resistor 34 and capacitor 27 by conductor 124. The cathode 62 of triode 60 is connected to capacitor 27 and ground connection 67 by conductor 125. The input voltage impressed on triode 60 is therefore the D. C. voltage drop appearing across resistor 34, the rectifier bridge, and the in-circuit portion of potentiometer 32, all in series. In parallel with this drop is a small A. C. ripple drop across condenser 27.

Cathode 62 of triode 60 is connected to the fixed positive terminal of grid bias potentiometer 32 by conductors 125, 98, and 65, ground connection 67, the ground, and ground connection 66. Grid 63 of triode 60 is connected to the movable negative terminal of grid bias potentiometer 32 by conductors 124 and 112, resistor 34, conductor 111, rectifier bridge 40, and conductors 115 and 86. This grid 63 is biased negatively by a D. C. voltage dependent upon the position of slider 105.

Capacitor 25 and potentiometer 30 form a series circuit (A), fed by secondary winding 73, in which the current is a direct function of the frequency. Inductor 28 and potentiometer 31 form a second series circuit (B), fed by secondary winding 101, in which the current is an inverse function of the frequency. Secondary windings 73 and 101 are electrically identical, as are potentiometers 30 and 31. Thus for a relatively low frequency, the current in series circuit A may be less than that in series circuit B; for a relatively high frequency the current in series circuit A may be greater than that in series circuit B. By properly selecting the circuit constants the device may be arranged so that for a selected frequency the currents in the two series circuits are equal. Then by properly adjusting the movable contacts 78 and 105 to make up for differences in the impedances of rectifier bridges 39 and 40, resistors 33 and 34, and capacitors 26 and 27, as well as slight electrical idiosyncracies in the triodes 50 and 60, all respectively, the signals may be made to have equivalent electrical effect on the output currents of triodes 50 and 51, again respectively.

On closing switch 56, electrical energy also passes by conductors 131 and 132 to the primary winding 130 of a second transformer 22 having a secondary winding 133, and this generates an alternating voltage in the secondary winding. The output circuit of triode 50 may be traced as follows: from the upper terminal of winding 133 through conductor 134, the plate 54 of triode 50, the triode, cathode 52, conductor 97, conductor 135, the armature 137 of a direct current motor 15 having a pair of field windings 46 and 47, conductor 141, field winding 46, conductor 142, and back to the other terminal of winding 133. Flow of current in this output circuit causes rotation of armature 137 in a first direction.

On closing switch 56 electrical energy further passes by conductors 143 and 144 to the primary winding 139 of a third transformer 23 having a secondary winding 145, and this generates an alternating voltage in the secondary winding. The output circuit of triode 60 may be traced as follows: from the upper terminal of winding 145 through conductor 146, plate 64 of triode 60, the triode, cathode 62, conductor 125, conductor 135, armature 137, conductor 141, field winding 47, conductor 147 and back to the other terminal of winding 145. Windings 46 and 47 are so arranged that currents flowing through them from conductor 141 cause the motor to rotate in opposite directions.

As previously pointed out, equivalent signals are impressed at the selected frequency, on the grids of triodes 50 and 60, causing equal currents to flow in the plate circuits. Now by properly adjusting grid bias potentiometer 32, the negative bias on both grids may be increased until both triodes cease to discharge. This will be referred to as the normal condition of the regulator.

The structure of a hydraulic transmission adapted for use in my system will now be described, reference being primarily made to Figures 3 and 4. Transmission 11 comprises a housing 150 having open ends and a central partition 151. Driving shaft 16 passes through an end plate 152 and driven shaft 17 passes through an end plate 153: the end plates are secured to the housing in fluid tight relation, and the same relation is maintained between the end plates and the shafts. Partition 151 divides housing 150 into a smaller chamber 154 and a larger chamber 155. Passages 156 and 157 leading from chambers 155 and 154 respectively are arranged to be selectively connected and cut off by the action of a valve 160 having a port 161 which can be aligned with the passages by rotation of the valve about its axis. The valve is provided with an extension shaft 162 passing through a packing gland 163 threadedly engaging housing 150.

Shaft 16 may be enlarged at its inner end to comprise a pump chamber 170, a distribution chamber 171 and a hollow portion 173. Shaft 16 passes through an opening 174 in partition 151 and is maintained in fluid tight bearing relationship therewith by a locking member 175. Hollow portion 173 communicates with chamber 154 by apertures 176 and 177, and with a pair of passages 180 and 181 leading into pump chamber 170.

Pump chamber 170 is provided with a fluid tight cover plate 182 through which shaft 17 also passes in fluid tight rotative relation. Shaft 17 is provided at its inner end with a gear 183 having a bearing 184 in the inner wall of pump chamber 170. Gear 183 is adapted to cooperate with gears 185 and 186 operating in appropriate recesses in chamber 170 to comprise a pair of gear pumps, and suitable passages 187 and 188 spaced from passages 180 and 181 are provided to give egress from pump chamber 170 into chamber 155.

In use the transmission is filled with fluid and shaft 16 is driven. If valve 160 is closed, no means of fluid passage between chambers 154 and 155 in response to the fluid pump operation is provided, the gears are hydraulically locked, and shaft 17 rotates with shaft 16. If on the other hand, valve 160 is wide open, the fluid pumped by interaction of the gears can easily return to chamber 154, gear 183 is not locked with gears 185 and 186, and shaft 17 does not rotate.

For any given speed of rotation of shaft 16, closing of valve 160 beyond a middle point will increase the speed of rotation of shaft 17, and opening of valve 160 beyond that point will decrease the speed of rotation of shaft 16.

*Operation*

The operation of my system can now be described. Suppose the engine to be operating at a cruising speed of 2,000 R. P. M., at which speed generator 14 is designed to produce alternating current of the desired frequency, say 400 cycles per second. The generator potential is applied to the primary of transformer 70, and potential drops appear across resistors 30 and 31 which are 180 degrees out of phase. Potentials also appear across the rectifier bridges of such polarity as to tend to bring the grids of the triodes to positive potentials compared with their respective cathodes. These rectifier bridge potentials, however, are opposed by the potentials of the grid bias battery 45, and the potential difference impressed across each of capacitors 26 and 27 is the resultant of a continuous D. C. component and an opposing pulsating D. C. component derived from the rectifier bridge. This resultant has a wave shape which may be analyzed as a basic D. C. potential and numerous superimposed A. C. ripple potentials of various frequencies, including the basic 400 cycles and its harmonics. To the various A. C. potentials the capacitors present impedances of greater or less magnitudes; to the D. C. potentials the capacitors are non-conducting. The effect of the capacitors is therefore to shunt out substantially all the A. C. potentials so that the potentials impressed upon the grids are substantially pure D. C. potentials.

As previously pointed out, at the desired frequency the currents through circuits A and B and therefore the pulsating potentials at the outputs of rectifier bridges 39 and 40 are equal. The magnitude of the bias potential is adjusted by potentiometer 32 until the resultant equal potentials on grids 53 and 63 are barely sufficient to prevent the tubes from firing. Since the frequency of the generator is that desired, the adjustment of valve 160, which should be in a position midway of its travel, is such that the resistance to the flow of fluid through the transmission is sufficient to allow the right amount of relative rotation between shafts 16 and 17, and there is no necessity for either tube to supply energy to actuate the motor 15 to close or open the valve.

Now let the speed of the engine increase to a maximum of, say 3000 R. P. M. This tends to cause the generator to produce 600 cycles A. C., but as the frequency of the current increases beyond 400 cycles, more current begins to flow in series circuit A than in series circuit B. A greater positive pulsating potential appears at the terminals of rectifier bridge 39 than that which the grid bias was adjusted to balance. Grid 53 therefore goes sufficiently positive to allow triode 50 to fire, and current passes to motor 15 through field winding 46 during each positive half cycle of plate 54. This causes the motor to operate, rotating shaft 162 in such a direction as to open valve 160 wider, until the smaller fluid resistance in the fluid transmission reduces the speed of rotation of shaft 17 to the value at which the frequency of generator 14 is again not desired. This in turn reduces the flow of current in potentiometer 30 and therefore the positive potential on grid 53, and tube 50 ceases firing at the next ensuing end of a positive half cycle.

Since the voltage applied to grid 53 will be greater, the more the frequency departs from 400 cycles, it will be apparent that the current flow through tube 50 to motor 15 will increase as the frequency departs from the desired value. This is true even where tubes 50 and 60 are gas-filled since an A. C. anode voltage is employed and in such case the output of a gas-filled tube varies with the grid voltage. If vacuum tubes were employed for tubes 50 and 60, this variation in current supplied to motor 15 would be even greater. Since motor 15, as described above, is a D. C. motor, it will be obvious that as the current supplied to it thus increases, it will tend to run faster and hence adjust the fluid transmission more rapidly. Thus when the frequency has departed substantially from the desired value, a more rapid correction is obtained than when the frequency departure is small.

At the time the positive potential of rectifier bridge 39 increases that of bridge 40 decreases, but as this simply increases the negative bias on grid 63 of tube 60, which is not firing, no effective change is brought about by this potential decrease.

Finally, let the speed of the engine drop to a minimum value of, say 1000 R. P. M. This tends to cause the generator to produce 200 cycle A. C., but as the frequency of the current decreases below 400 cycles, more current begins to flow in series circuit B than in series circuit A. A greater positive pulsating potential appears at the terminals of rectifier bridge 40 than that which the grid bias is adjusted to balance. Grid 63 therefore goes sufficiently positive to allow triode 60 to fire, and current passes to motor 15 during each positive half cycle of plate 64. This causes the motor to operate, rotating shaft 162 in such a direction as to close valve 160 tighter, until the greater fluid resistance in the fluid transmission increases the speed of rotation of shaft 17 to the value at which the frequency of generator 14 is again that desired. This in turn reduces the flow of current in potentiometer 31 and the positive potential on grid 63, and tube 60 ceases firing at the next ensuing end of a positive half cycle. Again, the speed at which motor 15 operates to adjust the transmission to correct the frequency is dependent upon how much the frequency drops below the desired value.

At the time the positive potential of rectifier bridge 40 increases, that of bridge 39 decreases, but as this simply increases the negative bias on the grid 53 of triode 50, which is not firing, no effective change is brought about by this potential decrease.

It will now be seen that I have disclosed a system for regulating the output of an electrodynamic machine whose output varies with its speed of rotation, so that the machine may be driven by a source of power having a variable speed. Substitutions and alterations in my system will be apparent to those skilled in the art, and therefore I do not wish to be limited by details of structure which are herein disclosed for the sake of illustration, but only by the subjoined claim.

I claim as my invention:

In a device of the class described, in combination: a rotatable shaft; means driven by said shaft to produce an alternating voltage of which the frequency varies with the speed of the shaft;

means for driving said shaft; means variably coupling said driving means to said shaft; reactive impedance means having an inherent characteristic response to current of a selected frequency and giving a response to the departure of said frequency from said selected value which varies in magnitude and direction with the magnitude and direction of said departure; a variable speed electric motor for varying said coupling means so as to maintain said frequency at said absolute value; and means for energizing said motor in a direction and to a varying extent dependent upon the direction and magnitude of the response of said impedance means, said last mentioned means being effective to cause said motor to vary said coupling means at a speed dependent upon the amount of departure of said frequency from said selected value.

CHARLES W. EICHHORN.

REFERENCES CITED

The following references are of record in the file of this patent:

UNITED STATES PATENTS

| Number | Name | Date |
|---|---|---|
| 563,316 | Schribner | July 7, 1896 |
| 1,143,727 | Robson | June 22, 1915 |
| 1,611,223 | Nyquist | Dec. 21, 1926 |
| 2,049,712 | Macalpine | Aug. 4, 1936 |
| 2,100,394 | Heising | Nov. 30, 1937 |
| 2,157,834 | Schmidt | May 9, 1939 |
| 2,187,364 | Ratie | Jan. 16, 1940 |
| 2,190,319 | Koch | Feb. 13, 1940 |
| 2,248,654 | Ballou | July 8, 1941 |
| 2,251,064 | Martin | July 29, 1941 |
| 2,269,434 | Brooks | Jan. 13, 1942 |
| 2,280,019 | Alexandersson | Apr. 14, 1942 |
| 2,280,569 | Crosby | Apr. 21, 1942 |
| 2,334,704 | Hilferty | Nov. 23, 1943 |
| 2,349,334 | Armentrout | May 23, 1944 |
| 2,398,419 | Finison | Apr. 16, 1946 |
| 2,449,905 | Lotts et al. | Sept. 21, 1948 |

FOREIGN PATENTS

| Number | Country | Date |
|---|---|---|
| 466,978 | France | Mar. 20, 1914 |